(12) United States Patent
Nakano et al.

(10) Patent No.: US 11,264,901 B2
(45) Date of Patent: Mar. 1, 2022

(54) ELECTRIC-POWER CONVERSION SYSTEM CONTROLLER

(71) Applicant: Mitsubishi Electric Corporation, Tokyo (JP)

(72) Inventors: Kotaro Nakano, Tokyo (JP); Noriyuki Wada, Tokyo (JP); Yoshihiko Kimpara, Tokyo (JP); Shingo Kato, Tokyo (JP); Tomonori Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 27 days.

(21) Appl. No.: 16/944,342

(22) Filed: Jul. 31, 2020

(65) Prior Publication Data

US 2021/0067040 A1 Mar. 4, 2021

(30) Foreign Application Priority Data

Aug. 26, 2019 (JP) .............................. JP2019-153380

(51) Int. Cl.
*H02M 3/158* (2006.01)
*H02M 3/335* (2006.01)
(Continued)

(52) U.S. Cl.
CPC ....... *H02M 3/158* (2013.01); *H02M 7/53871* (2013.01); *H02P 27/06* (2013.01)

(58) Field of Classification Search
CPC ............. H02M 3/158; H02M 3/33584; H02M 7/53871; H02M 1/32; H02M 1/327; H02M 1/0025; H02M 1/0054; H02P 29/68–685

See application file for complete search history.

(56) References Cited

U.S. PATENT DOCUMENTS

2004/0124808 A1\* 7/2004 Hirono .................... H02M 1/32
    318/806
2010/0273080 A1\* 10/2010 Noguchi ................. B60L 58/40
    429/442

(Continued)

FOREIGN PATENT DOCUMENTS

| JP | 2010-075048 A | 4/2010 | |
|---|---|---|---|
| JP | 2019075886 A | 5/2019 | |
| WO | WO-2008081722 A1 \* | 7/2008 | ................ B60L 3/12 |

OTHER PUBLICATIONS

Communication from the Japanese Patent Office dated Sep. 15, 2020 in Application No. 2019-153380.

*Primary Examiner* — Sisay G Tiku
(74) *Attorney, Agent, or Firm* — Sughrue Mion, PLLC; Richard C. Turner

(57) ABSTRACT

There is provided an electric-power conversion system controller in which even when the temperatures of a switching device and a diode included in the driving circuit for a converter become high, the performances of the devices are prevented from being deteriorated and the lifetimes thereof are prevented from being shortened. In the case where even when determining that direct-coupling control is to be performed, a positive-polarity-side device temperature is higher than a determination temperature, the electric-power conversion system controller performs voltage-boosting control in which the positive-polarity-side switching device and the negative-polarity-side switching device are on/off-controlled in an on/off period; in the case where the positive-polarity-side device temperature is the same as or lower than the determination temperature, the electric-power conversion system controller performs direct-coupling control in which the positive-polarity-side switching device is turned on and the negative-polarity-side switching device is turned off.

6 Claims, 6 Drawing Sheets

(51) Int. Cl.
*H02M 7/53854* (2007.01)
*H02M 1/32* (2007.01)
*H02M 7/5387* (2007.01)
H02P 27/06 (2006.01)

(56) References Cited

U.S. PATENT DOCUMENTS

| 2016/0172993 | A1* | 6/2016 | Yuasa | H02M 7/04 |
| | | | | 318/504 |
| 2017/0288593 | A1* | 10/2017 | Suzuki | H02P 27/08 |
| 2018/0145683 | A1* | 5/2018 | Shimizu | H02M 3/156 |
| 2019/0305681 | A1* | 10/2019 | Fujii | H02M 3/158 |
| 2019/0312542 | A1* | 10/2019 | Tagawa | H02P 29/68 |

\* cited by examiner

FIG.3

|  |  |  | device temperature | |
|---|---|---|---|---|
|  |  |  | low temperature | high temperature |
|  | FlagA \ FlagB | | 0 | 1 |
| basic control command | direct-coupling | 0 | FlagC=0 (direct-coupling) | FlagC=1 (voltage-boosting) |
| | voltage-boosting | 1 | FlagC=1 (voltage-boosting) | FlagC=1 (voltage-boosting) |

FIG.4

|  | direct-coupling control | voltage-boosting control |
|---|---|---|
| S1 | ON | ON ↔ OFF |
| S2 | OFF | OFF ↔ ON |

FIG.8

|  | device temperature ||
|---|---|---|
|  | low temperature | high temperature |
|  | gate cutoff control | cutoff on/off-control |
| S1 | OFF | ON ↔ OFF |
| S2 | OFF | OFF ↔ ON |

# ELECTRIC-POWER CONVERSION SYSTEM CONTROLLER

BACKGROUND OF THE INVENTION

Field of the Invention

The present disclosure relates to an electric-power conversion system controller.

Description of the Related Art

In general, when in an electric-power conversion system utilizing a switching device, the temperature of the switching device becomes higher, a loss in the device becomes larger. In contrast, the device withstanding voltage of a switching device in an inverter has temperature dependency in which it falls as the device temperature falls. PLT 1 discloses a load driving system in which in order to reduce a switching loss in a driving circuit, the upper limit value of the input voltage of the driving circuit is set to be lower, as the device temperature of a switching device is lower, and the DC output voltage is set in accordance with a request from an electric load, in such a way as to not exceed the set upper limit value of the input voltage.

PRIOR ART REFERENCE

Patent Document

[PLT 1] JP-A-2010-75048

SUMMARY OF THE INVENTION

In PLT 1, because the voltage on a DC power-source wiring is set in such a way as to become higher as the temperature of the switching device in the inverter becomes higher, the switching loss in the inverter, which is proportional to the voltage on the DC power-source wiring, increases. Moreover, when the temperature of the switching device in the inverter becomes higher, the performance of the switching device may be deteriorated and the lifetime thereof may be shortened. In addition, when the device temperature becomes higher, the performances of a switching device and a diode in the converter may also be deteriorated and the lifetimes thereof may also be shortened, as is the case with the switching device in the inverter; however, no countermeasure therefor have been taken.

The present disclosure has been implemented in order to solve the foregoing problems; the objective thereof is to provide an electric-power conversion system controller in which even when the temperatures of a switching device and a diode included in the driving circuit for a converter become high, the performances of the devices are prevented from being deteriorated and the lifetimes thereof are prevented from being shortened.

An electric-power conversion system controller according to the present disclosure is a controller for controlling a converter that boosts a DC voltage inputted through input terminals thereof and outputs the boosted DC voltage through output terminals thereof; the converter includes a positive-polarity-side switching device having a positive-polarity-side diode connected in anti-parallel therewith, a negative-polarity-side switching device having a negative-polarity-side diode connected in anti-parallel therewith, a reactor, and a temperature sensor that detects a temperature of one of or temperatures of both of the positive-polarity-side switching device and the positive-polarity-side diode; the positive-polarity-side switching device and the negative-polarity-side switching device are connected in series with each other between the positive-polarity-side output terminal and the negative-polarity-side output terminal; the connection point between the positive-polarity-side switching device and the negative-polarity-side switching device is connected with the positive-polarity-side input terminal via the reactor, and the negative-polarity-side output terminal and the negative-polarity-side input terminal are connected with each other; when performing voltage-boosting control in which a voltage between the output terminals is made higher than a voltage between the input terminals, the electric-power conversion system controller performs on/off control of the positive-polarity-side switching device and the negative-polarity-side switching device in an on/off period; when performing direct-coupling control in which the input terminals and the respective corresponding output terminals are directly coupled with each other, the electric-power conversion system controller turns on the positive-polarity-side switching device and turns off the negative-polarity-side switching device; in the case where even when determining that the direct-coupling control in which the input terminals and the respective corresponding output terminals are directly coupled with each other is to be performed, a temperature detected by the temperature sensor is higher than a determination temperature, the electric-power conversion system controller performs the voltage-boosting control, and in the case where the temperature is the same as or lower than the determination temperature, the electric-power conversion system controller performs the direct-coupling control.

In an electric-power conversion system controller according to the present disclosure, when during the direct-coupling control, an electric current flows between the positive-polarity input terminal and the positive-polarity output terminal of a converter, the electric current continuously passes through a positive-polarity-side switching device or a positive-polarity-side diode. Accordingly, the passage of a large current may raise the temperature of the positive-polarity-side switching device or the positive-polarity-side diode, thereby causing an overheated state.

When the temperature of the positive-polarity-side switching device, detected by a temperature sensor, or the temperature of the positive-polarity-side diode, detected by the temperature sensor, becomes higher than a determination temperature, the controller performs on/off-control of the positive-polarity-side switching device and the negative-polarity-side switching device of the converter in an on/off period; thus, it is made possible that an electric current is prevented from continuously concentrating in the positive-polarity-side switching device or the positive-polarity-side diode and hence the temperature of the positive-polarity-side switching device or the positive-polarity-side diode is lowered. As a result, the performance of the device can be prevented from being deteriorated by overheat and the lifetime of the device thereof can be prevented from being shortened.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 3 is a figure representing logic in the voltage command setter of the electric-power conversion system controller according to Embodiment 1;

FIG. 4 is a figure representing operational states of switching devices in a converter, which are caused by voltage-boosting control and direct-coupling control according to Embodiment 1;

FIG. 8 is a figure representing the operational states of switching devices in the converter at a time when it is determined that a gate cutoff according to Embodiment 1 is to be implemented.

DETAILED DESCRIPTION OF THE PREFERRED EMBODIMENTS

Embodiment 1

Figure 1:
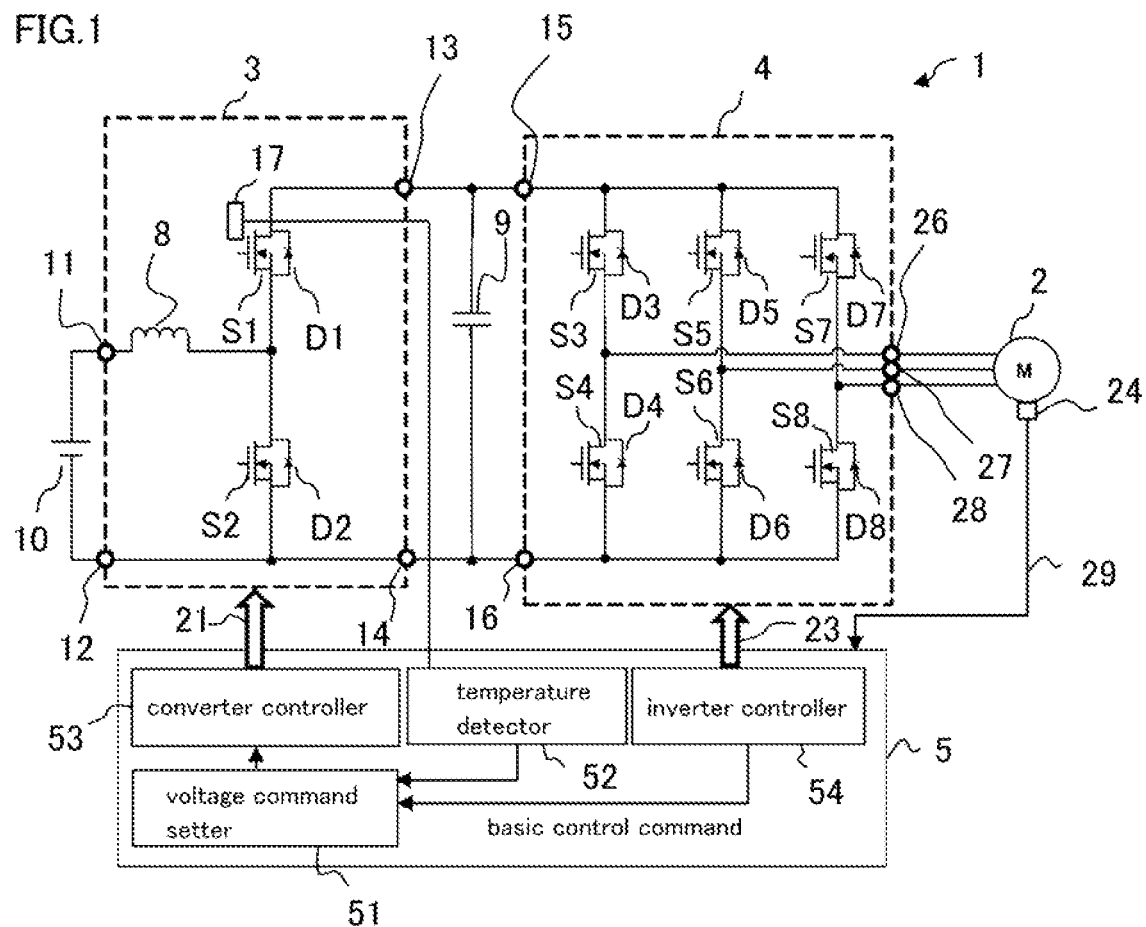
FIG. 1 is a configuration diagram of an electric-power conversion system controller according to Embodiment 1.

A controller 5 for an electric-power conversion system 1 (hereinafter, referred to simply as a controller 5) according to Embodiment 1 will be explained with reference to drawings. FIG. is a configuration diagram of the electric-power conversion system 1 and the controller 5 according to the present embodiment.

1. Electric-Power Conversion System

The controller 5 controls a converter 3 that boosts a DC voltage inputted through input terminals 11 and 12 and outputs the boosted voltage through the output terminals 13 and 14. The converter 3 includes a positive-polarity-side switching device S1 having a positive-polarity-side diode D1 connected in anti-parallel therewith, a negative-polarity-side switching device S2 having a negative-polarity-side diode D2 connected in anti-parallel therewith, and a reactor 8.

In the present embodiment, the positive-polarity-side switching device S1 is an FET (Field effect transistor) having the positive-polarity-side parasitic diode D1 connected in anti-parallel therewith; the negative-polarity-side switching device S2 is an FET having the negative-polarity-side parasitic diode D2 connected in anti-parallel therewith. The gate terminal of each of the switching devices S1 and S2 is connected with the controller 5; a control signal from the controller 5 turns on or off each of the switching devices S1 and S2.

The converter 3 has a positive-polarity-side temperature sensor 17 that detects a positive-polarity-side device temperature. The positive-polarity-side temperature sensor 17 can detect the temperature of the whole positive-polarity-side switching device S1 including the positive-polarity-side parasitic diode D1. The output signal of the positive-polarity-side temperature sensor 17 is inputted to the controller 5. As the positive-polarity-side temperature sensor 17, a temperature detection device such as a thermistor or a thermocouple is utilized.

The positive-polarity-side switching device S1 and the negative-polarity-side switching device S2 are connected in series with each other between the positive polarity side 13 of the output terminals (hereinafter, referred to as a positive-polarity-side output terminal 13) and the negative polarity side 14 of the output terminals (hereinafter, referred to as a negative-polarity-side output terminal 14); the connection point is connected with the positive polarity side 11 of the input terminals (hereinafter, referred to as a positive-polarity-side input terminal 11) by way of the reactor 8. The negative-polarity-side output terminal 14 is connected with the negative polarity side 12 of the input terminals (hereinafter, referred to as a negative-polarity-side input terminal 12).

By means of the switching devices S1 and S2 and the diodes D1 and D2, the converter 3 boosts a voltage supplied through the input terminals 11 and 12 from an external DC power source 10 and then outputs the boosted voltage through the output terminals 13 and 14. A capacitor 9 connected in parallel with the output terminals 13 and 14 of the converter 3 smooths the output voltage. By way of a positive-polarity-side input terminal 15 and a negative-polarity-side input terminal 16 of an inverter 4 in the electric-power conversion system 1, the smoothed boosted current is converted into an AC current by two or more switching devices S3, S4, S5, S6, S7, and S8 of the inverter and then is supplied to the outside through the output terminals 26, 27, and 28 of the inverter 4.

For the respective 3 phases, the positive-polarity-side switching devices S3, S5, and S7 are connected in series with the negative-polarity-side switching devices S4, S6, and S8, respectively, between the positive-polarity-side input terminal 15 and the negative-polarity-side input terminal 16 of the inverter 4; from the connection points, the outputs, for the respective phases, of the inverter are connected with corresponding 3 phase windings of an external AC rotating electric machine 2, through the output terminals 26, 27, and 28. The positive-polarity-side switching devices S3, S5, and S7 of the inverter 4 have positive-polarity-side diodes D3, D5, and D7, respectively, connected in anti-parallel therewith. The negative-polarity-side switching device S4, S6, and S8 of the inverter 4 have negative-polarity-side diodes D4, D6, and D8, respectively, connected in anti-parallel therewith.

Rotation information of the AC rotating electric machine 2 is detected by a rotation sensor 24 and then is transferred to the controller 5 through a signal wire 29. As the DC power source 10, a secondary battery such as a lead battery, a nickel-hydrogen battery, or a lithium ion battery can be utilized. The AC rotating electric machine 2 may be an AC motor that generates torque for driving the driving wheels of a hybrid automobile or an electric automobile.

The electric-power conversion system 1 can not only boost electric power supplied from the DC power source 10, convert the electric power into AC electric power, and then transfer the AC electric power to the AC rotating electric machine 2 but also make the inverter 4 convert AC electric power generated by the AC rotating electric machine 2 into DC electric power, make the converter 3 step down the DC electric power, and then supply the voltage-reduced DC electric power for charging the DC power source 10. Regenerative energy of the AC rotating electric machine 2 is returned to the DC power source 10, so that the energy can be utilized without waste.

2. Controller 5

The controller 5 is provided with a converter controller 53, a temperature detector 52, a voltage command setter 51, and an inverter controller 54.

The controller 5 is provided with a processing circuit for realizing the respective functions of the means. The processing circuit of the controller 5 may be formed of a digital electronic circuit such as a computing processing unit and a storage device, may be formed of an analogue electronic circuit such as a comparator, an operational amplifier, and a differential amplification circuit, or may be formed of both a digital electronic circuit and an analogue electronic circuit.

2-1. Converter Controller 53

The converter controller 53 performs on/off-control of the positive-polarity-side switching device S1 and the negative-polarity-side switching device S2. When the converter 3 transmits electric power, the converter controller 53 implements voltage-boosting control or direct-coupling control while switching them, in accordance with a command from the voltage command setter 51.

<Voltage-Boosting Control>

As represented in FIG. 4, when performing voltage-boosting control, the converter controller 53 alternately turns on and off the positive-polarity-side switching device S1 and the negative-polarity-side switching device S2 in an on/off period. In the present embodiment, the converter controller 53 changes the duty of an on/off signal for the switching device in such a way that the output voltage outputted from the output terminals 13 and 14 approaches a target voltage. The output voltage is detected by an unillustrated voltage sensor. The target voltage is set to be higher than the input voltage inputted to the input terminals 11 and 12. While the positive-polarity-side switching device S1 is tuned on, the negative-polarity-side switching device S2 is turned off; while the positive-polarity-side switching device S1 is tuned off, the negative-polarity-side switching device S2 is turned on. Basically, the on-duty of the positive-polarity-side switching device S1 corresponds to the off-duty of the negative-polarity-side switching device S2.

<Direct-Coupling Control>

As represented in FIG. 4, when performing direct-coupling control, the converter controller 53 turns on the positive-polarity-side switching device S1 and turns off the negative-polarity-side switching device S2. In this case, the positive-polarity-side switching device S1, which is turned on, and the positive-polarity-side diode D1 make it possible that an electric current bidirectionally flows between the positive-polarity-side input terminal 11 and the positive-polarity-side output terminal 13 of the converter via the reactor 8, so that the input terminal and the output terminal of the converter 3 are connected with each other in a substantially direct manner.

2-2. Temperature Detector 52

Based on the output signal of the positive-polarity-side temperature sensor 17, the temperature detector 52 detects a temperature Ts1 for both the positive-polarity-side switching device S1 and the positive-polarity-side diode D1 (hereinafter, referred to as a device temperature Ts1).

2-3. Voltage Command Setter 51

<Suppression of Overheated State>

When during the direct-coupling control, an electric current flows between the positive-polarity input terminal 11 and the positive-polarity output terminal 13 of the converter 3, the electric current continuously passes through the positive-polarity-side switching device S1 or the positive-polarity-side diode D1. Accordingly, the concentration of the passage of a large current may raise the temperature of the positive-polarity-side switching device S1 or the positive-polarity-side diode D1, thereby causing an overheated state.

Thus, in the case where even when it is determined that the direct-coupling control is to be performed, the device temperature Ts1 is higher than a determination temperature T1, the voltage command setter 51 determines that the voltage-boosting control is to be performed; in the case where the device temperature Ts1 is the same as or lower than the determination temperature T1, the voltage command setter 51 determines that the direct-coupling control is to be performed. Then, the voltage command setter 51 issues a command based on the determination result to the converter controller 53 so as to make the converter controller 53 perform the voltage-boosting control or the direct-coupling control for which the command has been issued.

This configuration makes it possible that in the case where during the direct-coupling control, the device temperature Ts1 exceeds the determination temperature T1, the voltage-boosting control is performed so that an electric current is prevented from continuously concentrating in the positive-polarity-side switching device S1 or the positive-polarity-side diode D1 and hence the temperatures of these devices are lowered. As a result, the performances of the devices can be prevented from being deteriorated by overheat and the lifetimes thereof can be prevented from being shortened. The determination temperature T1 is preliminarily set while considering the respective heat resistances of the switching device S1 and the diode D1.

<Determination Considering Basic Control Command>

In the present embodiment, the voltage command setter 51 receives a basic control command in which based on conditions other than the temperature, it has been determined which one of the voltage-boosting control and the direct-coupling control is to be performed. In the present embodiment, the voltage command setter 51 processes the basic control command received from the inverter controller 54 so that the basic control command can be utilized in other control actions. The details of a processing method for the basic control command according to the present embodiment will be described later.

In the case where even when the basic control command instructs that the direct-coupling control is to be performed, the device temperature Ts1 is higher than the determination temperature T1, the voltage command setter 51 performs the voltage-boosting control; in the case where the device temperature Ts1 is the same as or lower than the determination temperature T1, the voltage command setter 51 performs the direct-coupling control. In the case where the basic control command instructs that the voltage-boosting control is to be performed, the voltage command setter 51 performs the voltage-boosting control, regardless of whether the device temperature Ts1 is higher than the determination temperature T1 or the same as or lower than the determination temperature T1.

In the case where the basic control command instructs that the voltage-boosting control is to be performed, it is required that in order to make the load side (in this example, the inverter 4) exert its function, the boosted voltage is supplied thereto; in the case where the basic control command instructs that the direct-coupling control is to be performed, it is not required, in many cases, that in order to make the load side exert its function, the boosted voltage is supplied thereto. In the foregoing configuration, in the case where the basic control command instructs that the voltage-boosting control is to be performed, the voltage-boosting control is performed regardless of whether the device temperature Ts1 is high or low; therefore, it is made possible to satisfy the requirement from the load side and to make the load side exert its function. In contrast, in the case where the basic control command instructs that the direct-coupling control is to be performed and the device temperature Ts1 is higher than the determination temperature T1, the voltage-boosting control is performed, so that the device temperature Ts1 can be lowered. In this case, even when the boosted voltage is supplied to the load side, the load side can exert its function.

Figure 2:
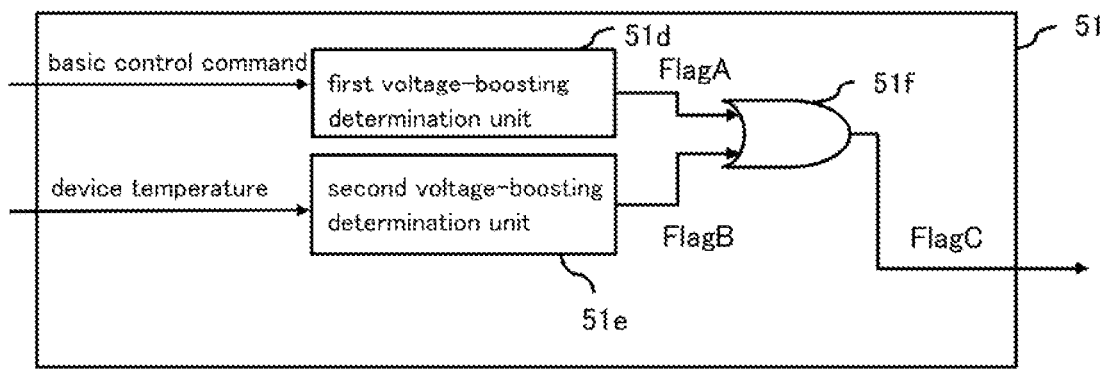
FIG. 2 is a block diagram of a voltage command setter in the electric-power conversion system controller according to Embodiment 1.

Such determination by the voltage command setter 51 can be configured, for example, as represented by a block diagram in FIG. 2. The voltage command setter 51 is provided with a first voltage-boosting determination unit 51d, a second voltage-boosting determination unit 51e, and an OR logic circuit 51f.

The basic control command is inputted to the first voltage-boosting determination unit 51d. As represented in FIG. 3, when the basic control command is an execution command for the direct-coupling control, the first voltage-boosting determination unit 51d outputs a FlagA signal set to "0"; when the basic control command is an execution command for the voltage-boosting control, the first voltage-boosting determination unit 51d outputs the FlagA signal set to "1".

The device temperature Ts1 detected by the temperature detector 52 is inputted to the second voltage-boosting determination unit 51e. When the device temperature Ts1 is higher than the determination temperature T1, the second voltage-boosting determination unit 51e outputs a FlagB signal set to "1"; when the device temperature Ts1 is the same as or lower than the determination temperature T1, the second voltage-boosting determination unit 51e outputs the FlagB signal set to "0".

The FlagA signal and the FlagB signal are inputted to the OR logic circuit 51f. As represented in FIG. 3, the OR logic circuit 51f outputs, as a FlagC signal, the determination result of an OR logical operation on the FlagA signal and the FlagB signal. Specifically, when one of or both of the FlagA signal and the FlagB signal are "1", the OR logic circuit 51f outputs the FlagC signal set to "1"; when both of the FlagA signal and the FlagB signal are "0", the OR logic circuit 51f outputs the FlagC signal set to "0". When the FlagC signal is "0", it is suggested that the result of a determination by the voltage command setter 51 indicates the direct-coupling control; when the FlagC signal is "1", it is suggested that the result of a determination by the voltage command setter 51 indicates the voltage-boosting control. The FlagC signal is transferred to the converter controller 53. The function represented by the block diagram in FIG. 2 may be realized either by an analogue circuit or through program implementation by a computing processing unit.

<Inverter Controller 54 and Setting of Basic Control Command>

In the present embodiment, the inverter controller 54 sets the basic control command and transfers the basic control command to the voltage command setter 51. The inverter controller 54 controls the AC rotating electric machine 2 by performing on/off-control of the switching devices S3 through S8 of the inverter 4. The inverter controller 54 performs the control by use of a publicly known vector control method or the like; however, the explanation for the details thereof will be omitted. The inverter controller 54 detects the rotation speed of the AC rotating electric machine 2, based on the output signal of the rotation sensor 24.

Figure 5:
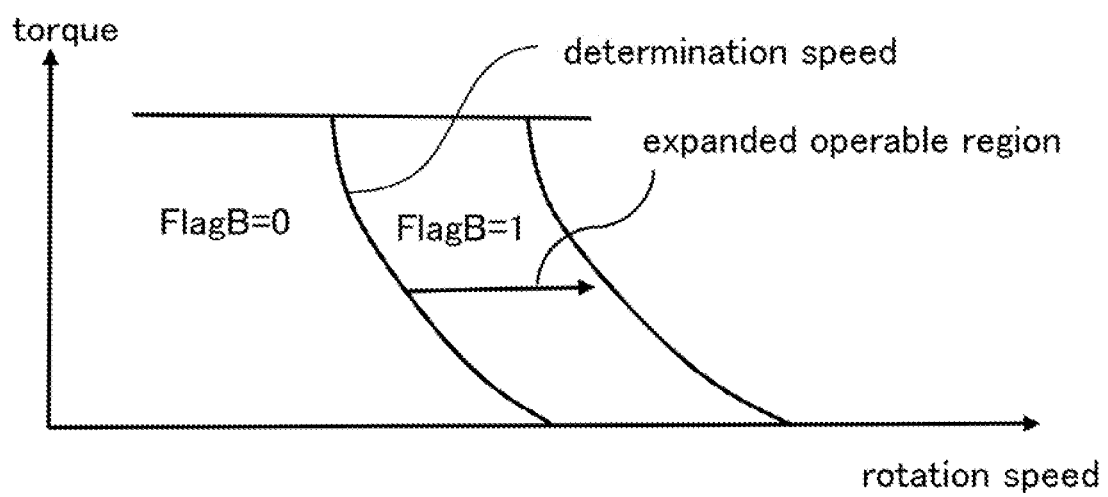
FIG. 5 is a graph for explaining setting of a basic control command by an inverter controller according to Embodiment 1.

As represented in FIG. 5, the AC voltage applicable to the AC rotating electric machine 2 can be raised more, as the DC voltage to be supplied to the inverter 4 is higher; therefore, up to a high rotation speed at which the reverse electromotive voltage across the coil becomes large, the operable region of the AC rotating electric machine 2 can be expanded. In contrast, at a low rotation speed, it is desirable that in order to reduce the power loss in voltage-boosting operation by the converter 3, the voltage-boosting operation by the converter 3 is stopped.

When the rotation speed of the AC rotating electric machine 2 becomes higher than a determination speed N1, the inverter controller 54 determines that the voltage-boosting control is to be performed; when the rotation speed of the AC rotating electric machine 2 is the same as or lower than the determination speed N1, the inverter controller 54 determines that the direct-coupling control is to be performed. The inverter controller 54 transfers the determination result, as the basic control command, to the voltage command setter 51. As represented in FIG. 5, the inverter controller 54 lowers the determination speed N1, as the output torque of the AC rotating electric machine 2 increases.

<Example of Operational Behavior Corresponding to Device Temperature>

Figure 6:
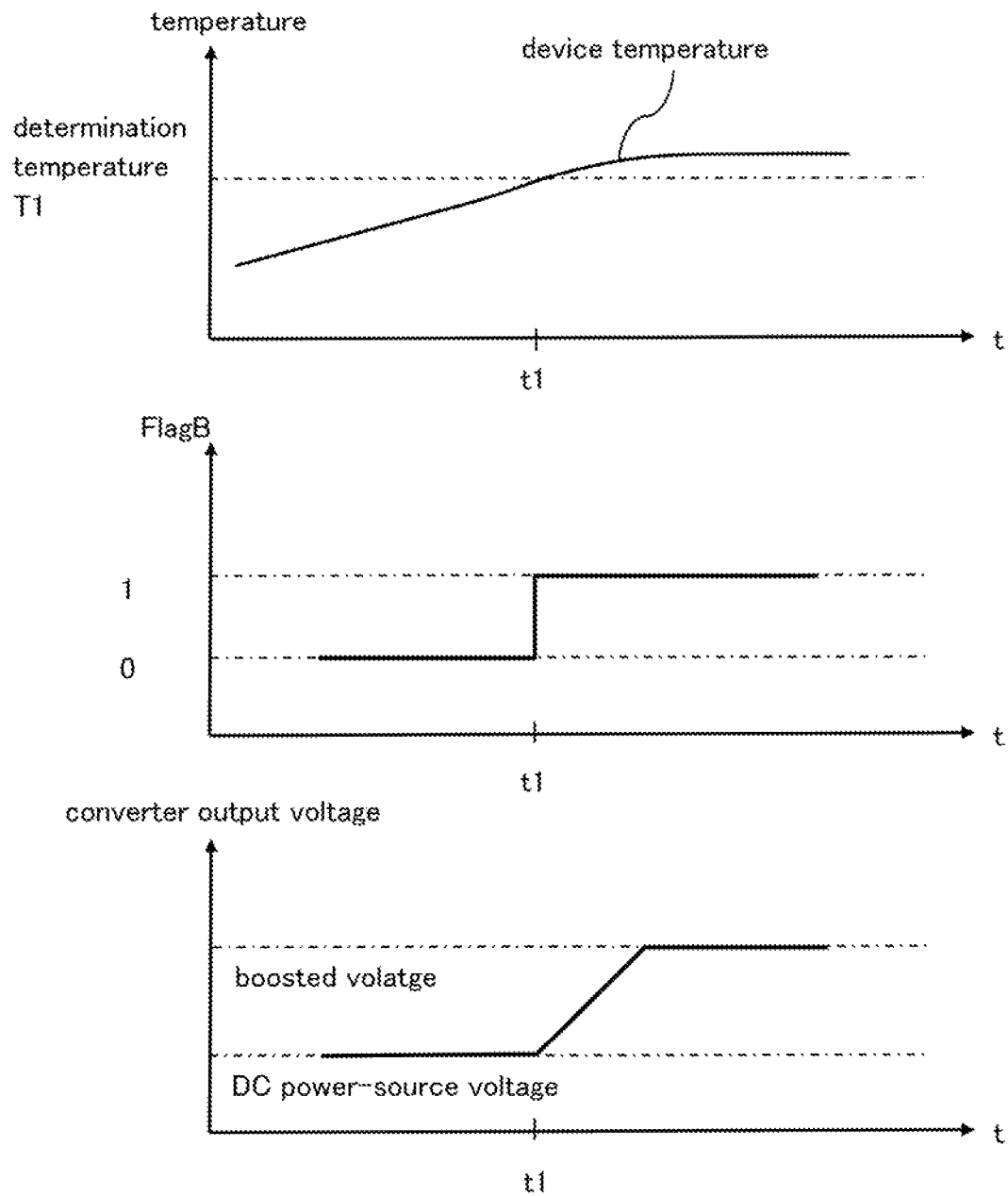
FIG. 6 is a timing chart for explaining the operational state of the converter in accordance with a device temperature in the electric-power conversion system according to Embodiment 1.

FIG. 6 is a timing chart for explaining an example of the operational behavior, corresponding to the device temperature, of the converter in the controller 5. FIG. 6 explains the operational state of the converter 3 by the controller 5 at a time when the device temperature, that has been lower than T1, exceeds T1.

FIG. 6 represents the case where the device temperature rises while the converter 3 supplies electric power with the direct-coupling control. At the time point t1, with respect to the determination temperature T1, the device temperature changes from the determination temperature T1 or lower to the determination temperature T1 or higher. Accordingly, at the time point t1, the second voltage-boosting determination unit 51e changes its output from "FlagB=0" to "Flag B=1". Then, at the time point t1, the OR logic circuit 51f changes its output from "FlagC=0" to "Flag C=1", so that the command to the converter controller 53 is changed from the direct-coupling control to the voltage-boosting control. As a result, at the time point t1, the converter controller 53 starts the voltage-boosting control and hence the output voltage gradually increases toward the target voltage. After the start of the voltage-boosting control, the device temperature Ts1 is suppressed from rising.

<Example of Operational Behavior Corresponding to Rotation Speed>

Figure 7:
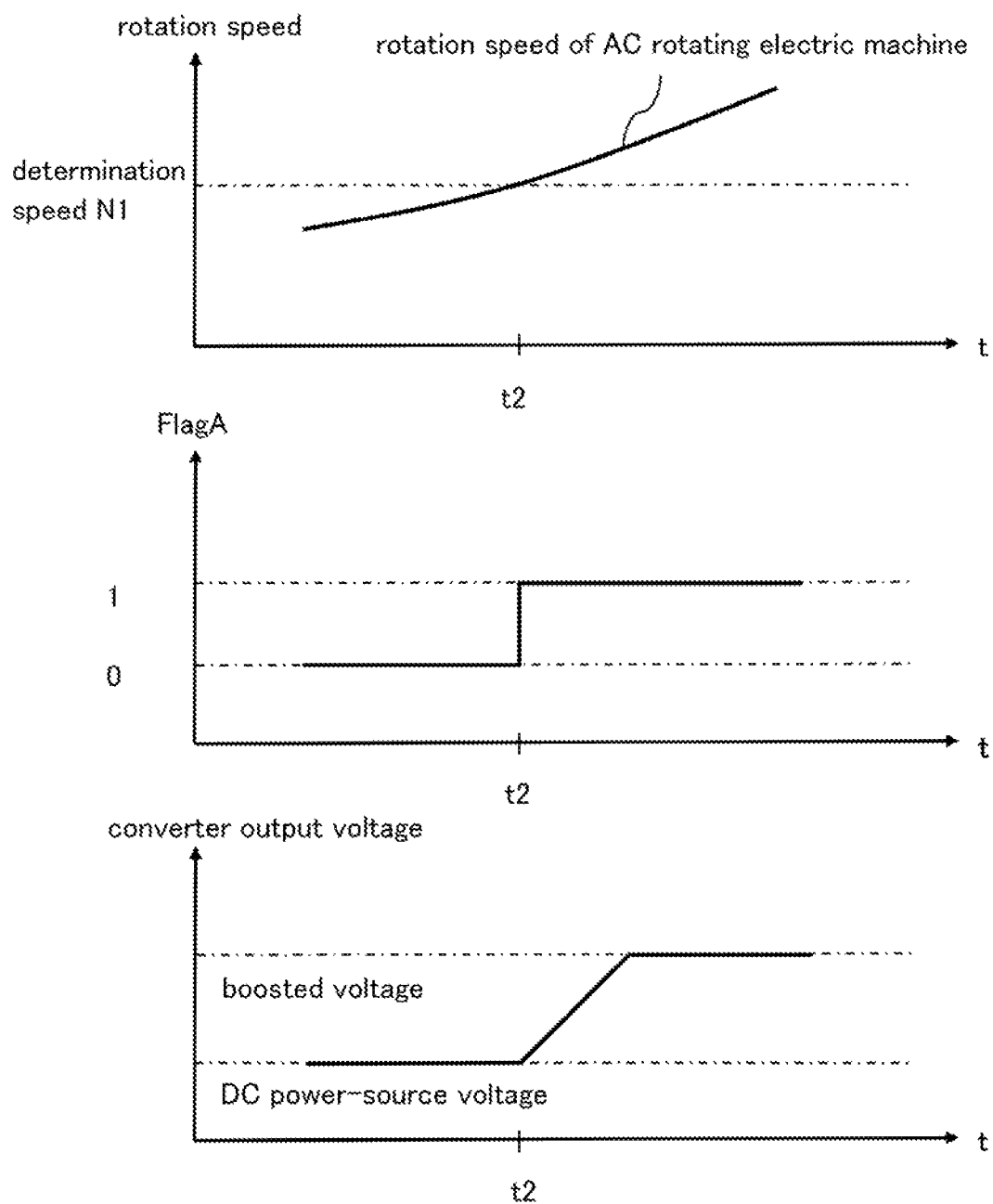
FIG. 7 is a timing chart for explaining the operational state of the converter in accordance with a rotation speed of an AC rotating electric machine according to Embodiment 1.

FIG. 7 is a timing chart for explaining an example of the operational behavior, corresponding to the rotation speed of the AC rotating electric machine 2, of the converter in the controller 5. FIG. 7 explains the operational state of the converter 3 by the controller 5 at a time when the rotation speed, that has been lower than the determination speed N1, exceeds the determination speed N1.

FIG. 7 represents the case where the rotation speed of the AC rotating electric machine 2 rises while the converter 3 supplies electric power with the direct-coupling control. At the time point t2, with respect to the determination speed N1, the rotation speed, that has been lower than the determination speed N1, exceeds the determination speed N1. At the time point t2, because the rotation speed exceeds the determination speed N1, the inverter controller 54 changes the basic control command from the direct-coupling control to the voltage-boosting control, so that the first voltage-boosting determination unit 51d changes its output from "FlagA=0" to "FlagA=1". Then, at the time point t2, the OR logic circuit 51f changes its output from "FlagC=0" to "Flag C=1", so that the command to the converter controller 53 changes from the direct-coupling control to the voltage-boosting control. As a result, at the time point t2, the converter controller 53 starts the voltage-boosting control and hence the output voltage gradually increases toward the target voltage. The voltage boosting makes it possible to expand the operable region of the AC rotating electric machine 2 up to a high rotation speed.

<Gate Cutoff>

When determining that electric-power transmission by the converter 3 is to be stopped, the inverter controller 54 performs gate cutoff control in which in general, the positive-polarity-side switching device S1 and the negative-polarity-side switching device S2 are turned off.

<Suppression of Overheated State>

In some cases, even when in the gate cutoff control, both the positive-polarity-side switching device S1 and the negative-polarity-side switching device S2 are turned off, a DC current from the DC power source 10 passes through the positive-polarity-side diode D1 connected in anti-parallel with the positive-polarity-side switching device S1 and is transferred to the positive-polarity-side input terminal 15 of the inverter 4, via the positive-polarity-side output terminal 13 of the converter 3. Thus, an electric current continuously passes through the positive-polarity-side diode D1. In this situation, the concentration of a large current may raise the temperature of the positive-polarity-side diode D1, thereby causing an overheated state.

<On/Off-Control at Cutoff Time>

Accordingly, as represented in FIG. 8, in the case where even when determining that the gate cutoff for cutting off the converter 3 is to be performed, the device temperature Ts1 is higher than the determination temperature T1, the inverter controller 54 performs a cutoff on/off-control in which the positive-polarity-side switching device S1 and the negative-polarity-side switching device S2 are on/off-controlled in a cutoff on/off period. In the cutoff on/off-control, the negative-polarity-side switching device S2 is turned off while the positive-polarity-side switching device S1 is turned on; the negative-polarity-side switching device S2 is turned on while the positive-polarity-side switching device S1 is turned off.

In contrast, when the device temperature Ts1 is the same as or lower than the determination temperature T1, the inverter controller 54 performs the gate cutoff control in which the positive-polarity-side switching device S1 and the negative-polarity-side switching device S2 are turned off.

Because the positive-polarity-side switching device S1 and the negative-polarity-side switching device S2 are on/off-controlled in the cutoff on/off period, it is made possible that an electric current is suppressed from continuously concentrating in the positive-polarity-side diode D1 and hence the temperature of the positive-polarity-side diode D1 is suppressed from rising.

In some cases, it is not desired that while the gate is cut off, the output voltage is boosted. Accordingly, it may be allowed that the cutoff on/off period is set to be longer than the voltage-boosting control on/off period. As a result, the cutoff on/off-control can suppress the output voltage from being boosted.

In the case where during the gate cutoff control, both the positive-polarity-side switching device S1 and the negative-polarity-side switching device S2 are turned off and an electric current flows in the negative-polarity-side diode D2, the temperature of the negative-polarity-side diode D2 rises. Thus, it may be allowed that a temperature sensor for detecting the temperature of one of or the temperatures of both of the negative-polarity-side switching device S2 and the negative-polarity-side diode D2 is separately provided and the temperature detector 52 detects a negative-polarity-side device temperature. In this case, it may be allowed that in the case where even when determining that the gate cutoff for cutting off the converter 3 is to be performed, the negative-polarity-side device temperature is higher than the determination temperature T1, the inverter controller 54 performs the cutoff on/off-control in which the positive-polarity-side switching device S1 and the negative-polarity-side switching device S2 are on/off-controlled in the cutoff on/off period. In contrast, when the negative-polarity-side device temperature is the same as or lower than the determination temperature T1, the inverter controller 54 may perform the gate cutoff control in which the positive-polarity-side switching device S1 and the negative-polarity-side switching device S2 are turned off. In the case where as the positive-polarity-side switching device S1 and the negative-polarity-side switching device S2, the respective products that are identical to each other are utilized and in the case where as the positive-polarity-side diode D1 and the negative-polarity-side diode D2, the respective products that are identical to each other are utilized, the determination temperature T1 can be utilized commonly in the positive-polarity side and the negative-polarity side.

Other Embodiments

Other embodiments of the present disclosure will be explained. The respective configurations of the embodiments explained below are not limited to the ones to be utilized alone; as long as no discrepancy occurs, each of those configurations can be utilized in combination with the configurations of the other embodiments.

(1) In foregoing Embodiment 1, as an example, there has been explained the case where each of the positive-polarity-side switching device S1 and the negative-polarity-side switching device S2 of the converter 3 is an FET having a parasitic diode connected in anti-parallel therewith. However, it may be allowed that each of the positive-polarity-side switching device S1 and the negative-polarity-side switching device S2 is a bipolar transistor or an IGBT (Insulated Gate Bipolar Transistor) having a diode connected in anti-parallel therewith.

(2) In foregoing Embodiment 1, as an example, there has been explained the case where the positive-polarity-side temperature sensor 17 detects the temperatures of both the positive-polarity-side switching device S1 and the positive-polarity-side diode D1 that are integrally formed. However, it may be allowed that in the case where when the positive-polarity-side switching device S1 and the positive-polarity-side diode D1 are separated from each other, the temperature of any one of respective temperature sensors provided in both of the positive-polarity-side switching device S1 and the positive-polarity-side diode D1 is higher than the determination temperature, the voltage-boosting control is performed. Moreover, it may be allowed that the positive-polarity-side temperature sensor 17 is provided at one of the positive-polarity-side switching device S1 and the positive-polarity-side diode D1 that are provided adjacent to each other and the temperature of the other one thereof can be estimated from the temperature of the one thereof.

(3) In foregoing Embodiment 1, as an example, there has been explained the case where the basic control command is an instruction in which it has been determined that when a rotation speed of the AC rotating electric machine becomes higher than a determination speed, the voltage-boosting control is performed, and when the rotation speed is the same as or lower than the determination speed, the direct-coupling control is performed. However, it may be allowed that the basic control command is an instruction to be determined based on a condition other than the rotation speed of the AC rotating electric machine. For example, it may be allowed that the basic control command is an instruction in which it has been determined that for example, when the converter 3 is activated or when the negative-polarity-side switching device S2 fails, the direct-coupling control is performed and that for example, when the power consumption in the load increases or when the input voltage falls, the voltage-boosting control is performed.

(4) In foregoing Embodiment 1, as an example, there has been explained the case where the output terminals of the converter are connected with the inverter that converts DC electric power into AC electric power and then supplies the AC electric power to the AC rotating electric machine. However, it may be allowed that the output terminals of the converter are connected with various kinds of loads.

(5) In foregoing Embodiment 1, as an example, there has been explained the case where the single controller 5 includes the converter controller 53, the temperature detector 52, the voltage command setter 51, and the inverter controller 54. However, it may be allowed that the converter controller 53, the temperature detector 52, and the voltage command setter 51 are provided in a single controller and the inverter controller 54 is provided in another separate controller.

(6) In foregoing Embodiment 1, as an example, there has been explained the case where the basic control command is transferred from the inverter controller 54 provided inside the controller 5. However, it may be allowed that the basic control command is transferred from the outside of the controller 5.

(7) In foregoing Embodiment 1, as an example, there has been explained the case where when determining that the gate cutoff is to be performed, the controller 5 implements the cutoff on/off-control or the gate cutoff control by switching them in accordance with the device temperature. However, it may be allowed that when determining that the gate cutoff is to be performed, the controller 5 does not implement the cutoff on/off-control but implements only the gate cutoff control.

(8) In foregoing Embodiment 1, the temperature sensor can detect the respective temperatures of the positive-polarity-side switching device S1, the positive-polarity-side diode D1, the negative-polarity-side switching device S2, and the negative-polarity-side diode D2 of the converter 3. It may be allowed that when the temperature of any one of the foregoing devices exceeds a determination temperature T2, which is higher than the determination temperature T1, it is displayed that the AC rotating electric machine 2 needs to be decelerated or stopped, or deceleration control or stopping control of the AC rotating electric machine 2 is performed. The reason for the above is that it is required to prevent overheating from deteriorating the foregoing devices. The determination temperature T2 can preliminarily be set, as a temperature at which the probability of the deterioration is higher, by considering the respective heat resistances of the positive-polarity-side switching device S1, the positive-polarity-side diode D1, the negative-polarity-side switching device S2, and the negative-polarity-side diode D2 of the converter 3.

In the present disclosure, illustrative embodiments are described; however, various features, modes, and functions disclosed in the embodiments are not limited to being applied to a specific embodiment but can be applied to embodiments separately or in various combinations. It is therefore understood that numerous modifications which have not been exemplified can be devised without departing from the scope of the technology disclosed in the specification of the present disclosure. For example, the case where at least one constituent element is modified, added, or omitted is included.

What is claimed is:

1. An electric-power conversion system controller for controlling a converter that boosts a DC voltage inputted through input terminals thereof and outputs the boosted DC voltage through output terminals thereof, wherein the converter includes a positive-polarity-side switching device having a positive-polarity-side diode connected in antiparallel therewith, a negative-polarity-side switching device having a negative-polarity-side diode connected in antiparallel therewith, a reactor, and a temperature sensor that detects a temperature of one of or a temperatures of both of the positive-polarity-side switching device and the positive-polarity-side diode, wherein the positive-polarity-side switching device and the negative-polarity-side switching device are connected in series with each other between a positive-polarity-side output terminal and a negative-polarity-side output terminal, wherein a connection point between the positive-polarity-side switching device and the negative-polarity-side switching device is connected with a positive-polarity-side input terminal via the reactor, and the negative-polarity-side output terminal and a negative-polarity-side input terminal are connected with each other, wherein when performing voltage-boosting control in which a voltage between the output terminals is made higher than a voltage between the input terminals, the electric-power conversion system controller performs on/off control of the positive-polarity-side switching device and the negative-polarity-side switching device in an on/off period, and when performing direct-coupling control in which the input terminals and the respective corresponding output terminals are directly coupled with each other, the electric-power conversion system controller turns on the positive-polarity-side switching device and turns off the negative-polarity-side switching device, and wherein in the case where even when determining that the direct-coupling control is to be performed, the temperature detected by the temperature sensor is higher than a determination temperature, the electric-power conversion system controller performs the voltage-boosting control, and in the case where the temperature is the same as or lower than the determination temperature, the electric-power conversion system controller performs the direct-coupling control.

2. The electric-power conversion system controller according to claim 1, wherein there is set a basic control command in which based on conditions other than the temperature, it has been determined which one of the voltage-boosting control and the direct-coupling control is to be performed, wherein in the case where even when the basic control command instructs that the direct-coupling control is to be performed, the temperature is higher than the determination temperature, the electric-power conversion system controller performs the voltage-boosting control, and in the case where the temperature is the same as or lower than the determination temperature, the electric-power conversion system controller performs the direct-coupling control, and wherein in the case where the basic control command instructs that the voltage-boosting control is to be performed, the electric-power conversion system controller performs the voltage-boosting control, regardless of whether the temperature is higher than the determination temperature or the same as or lower than the determination temperature.

3. The electric-power conversion system controller according to claim 2, wherein the output terminals are connected with an inverter that converts DC electric power into AC electric power and then supplies the AC electric power to an AC rotating electric machine, and wherein the basic control command is an instruction in which it has been determined that when a rotation speed of the AC rotating electric machine becomes higher than a determination speed, the voltage-boosting control is performed, and when the rotation speed is the same as or lower than the determination speed, the direct-coupling control is performed.

4. The electric-power conversion system controller according to claim 3, wherein in the case where even when determining that gate cutoff for cutting off the converter is to be performed, the temperature is higher than the determination temperature, the electric-power conversion system controller performs on/off-control of the positive-polarity-side switching device and the negative-polarity-side switching device in a cutoff on/off period, and in the case where the temperature is the same as or lower than the determination temperature, the electric-power conversion system controller turns off the positive-polarity-side switching device and the negative-polarity-side switching device.

5. The electric-power conversion system controller according to claim 2, wherein in the case where even when determining that gate cutoff for cutting off the converter is to be performed, the temperature is higher than the determination temperature, the electric-power conversion system controller performs on/off-control of the positive-polarity-side switching device and the negative-polarity-side switching device in a cutoff on/off period, and in the case where the temperature is the same as or lower than the determination temperature, the electric-power conversion system controller turns off the positive-polarity-side switching device and the negative-polarity-side switching device.

6. The electric-power conversion system controller according to claim 1, wherein in the case where even when determining that gate cutoff for cutting off the converter is to be performed, the temperature is higher than the determination temperature, the electric-power conversion system controller performs on/off-control of the positive-polarity-side switching device and the negative-polarity-side switching device in a cutoff on/off period, and in the case where the temperature is the same as or lower than the determination temperature, the electric-power conversion system controller turns off the positive-polarity-side switching device and the negative-polarity-side switching device.

* * * * *